United States Patent
Kogure et al.

Patent Number: 5,385,188
Date of Patent: * Jan. 31, 1995

[54] PNEUMATIC RADIAL TIRE FOR PASSENGER CARS

[75] Inventors: Tomohiko Kogure, Minami-ashigara; Yusaku Miyazaki, Hiratsuka, Japan

[73] Assignee: The Yokohama Rubber Co., Ltd., Tokyo, Japan

[ * ] Notice: The portion of the term of this patent subsequent to Dec. 20, 2011 has been disclaimed.

[21] Appl. No.: 875,783

[22] Filed: Apr. 29, 1992

[51] Int. Cl.$^6$ .................... B60C 9/18; B60C 11/04
[52] U.S. Cl. .................... 152/209 R; 152/531
[58] Field of Search ............. 152/209 R, 209 D, 526, 152/531

[56] References Cited

U.S. PATENT DOCUMENTS

| | | | |
|---|---|---|---|
| 4,202,394 | 5/1980 | der Burg | 152/536 |
| 4,469,157 | 9/1984 | Morikawa et al. | 152/529 |
| 4,854,360 | 8/1989 | Nagumo et al. | 152/529 |
| 4,865,102 | 9/1989 | Saneto et al. | 152/531 |
| 4,884,607 | 12/1989 | Mori | 152/209 R |
| 4,986,324 | 1/1991 | Suzuki et al. | 152/209 R |
| 5,000,239 | 3/1991 | Brayer et al. | 152/209 R |
| 5,135,038 | 8/1992 | Graas et al. | 152/209 R |

FOREIGN PATENT DOCUMENTS

| | | | |
|---|---|---|---|
| 0157404 | 7/1986 | Japan | 152/531 |
| 2066171 | 7/1981 | United Kingdom | 152/209 |

OTHER PUBLICATIONS

"Pneumatic Tyre Design"; E. C. Woods; 1955; pp. 32–34.
1992 Year Book the Tire and Rim Association, Inc., pp. 1-01, 1-06, 1-08, 1-10, and 1-12.

Primary Examiner—Michael W. Ball
Assistant Examiner—Nancy T. Krawczyk
Attorney, Agent, or Firm—Nikaido, Marmelstein, Murray & Oram

[57] ABSTRACT

A pneumatic radial tire for passenger cars having a plurality of grooves formed in the tread and extending at least circumferentially of the tire, the tread being provided with two belt plies therein in such a manner that their belt cords extend in a crisscross pattern. The grooves have a depth in the range of 6.0 to 8.5 mm, with the thickness of the under-groove rubber layer from the bottom of the grooves to the outer belt ply being fixed within the range of 0.5 to 2.0 mm. The belt plies are placed one over another with the both edge portions left unfolded. At least one of the plies is made from aramid fiber cords and at least the both edge portions of the belt plies are covered with at least one belt cover ply which has a cord angle of no greater than 30 deg with respect to the circumference of the tire. The belt cover ply is made of organic fiber cords no larger than 0.7 mm in diameter at a picking density of 35 to 90 percent.

8 Claims, 3 Drawing Sheets

PNEUMATIC RADIAL TIRE FOR PASSENGER CARS

BACKGROUND OF THE INVENTION

This invention relates to a pneumatic radial tire for passenger cars designed to improve steering stability while achieving weight reduction of the tread-belt structure.

The recent global spread of environmental pollution has produced a strong demand for more and more fuel-efficient vehicles. One approach, weight reduction of tires, is attracting attention as a major technological challenge.

Among pneumatic redial tires for passenger cars, those in which the belt plies are built of steel cords are known to produce high steering stability. This is because steel cords possess very high strength and resilience compared with other cords of fabrics. However, the steel cords, with greater specific weight, add more to the weight of tires and hence to the fuel cost. They therefore can hardly solve the above-mentioned technical problem.

As a new tire cord material almost comparable to steel cords in characteristics, aramid fiber cords have been proposed. Aramid fiber cords have practically as high strength and resilience as steel cords, but are lighter in specific weight and can contribute to the weight reduction of tires. It has been found, for example, that mere replacement of belt plies of steel cords by those of aramid fiber cords lessens the tire weight by about 5 to 8 percent.

Aramid fiber cords, whose compression rigidity is almost zero, have the disadvantage of exhibiting low flexural rigidity upon exposure to bending deformation. Cornering power given by a tire with belt plies using aramid fiber cords in place of steel cords of the same structure is at most 75 percent of the power obtained with a tire having steel-cord belt plies. With aramid fiber cords, therefore, it has been believed practically impossible to enhance the steering stability to the level attainable with a tire of the belt structure using steel cords.

SUMMARY OF THE INVENTION

This invention has for its object the provision of a pneumatic radial tire for passenger cards which is reduced in weight by the use of aramid fiber cords in the balt structure and yet is capable of achieving greater steering stability than that of the conventional tire having belt plies that use steel cords.

The pneumatic radial tire for passenger cars which realizes the above object has a plurality of grooves formed in the tread and extending at least circumferentially of the tire, the tread being provided with two belt plies therein in such a manner that the belt cords extend in a crisscross pattern, characterized in that the grooves have a depth in the range of 6.0 to 8.5 mm, with the thickness of the under-groove rubber layer from the bottom of the grooves to the outer belt ply being fixed within the range of 0.5 to 2.0 mm, said belt plies being placed one over another with the both edge portions left unfolded, at least one of said belt plies being made from aramid fiber cords, and at least the both edge portions of said belt plies are covered with at least one belt cover ply having a cord angle of no greater than 30 deg with respect to the circumference of the tire, said at least one belt cover ply being made of organic fiber cords no larger than 0.7 mm in diameter at a picking density of 35 to 90 percent.

As stated above, the depth of grooves and the thickness of the rubber layer under the grooves are fixed to be less than those in conventional tires and the belt plies are fabricated from aramid fiber cords. Consequently, the tire is lighter than the conventional tires using belt plies of steel cords alone. The choice of smaller values for the groove depth and the undergroove rubber thickness of the tread is combined with the provision of the belt cover ply of organic fiber cords with specific cord diameter and picking density to permit the tire to exhibit a cornering power greater than that of a conventional tire having steel-cord belt plies.

For the purposes of the invention the term "depth of grooves" (d) is used to mean the distance, as shown in FIG. 2, measured perpendicularly from the tread surface to the bottom of the deepest of the grooves. The expression "thickness of the rubber layer under the grooves" (t) applies to the distance between the bottom of the deepest groove and the surface of the cords of the outer belt ply ($4u$). By the "picking density" (%) is meant the value defined as $$p(\%) = (a \div p) \times 100$$

where a is the diameter of organic fiber cords forming the belt cover ply and p is the distance (pitch) between the axial centers of two adjacent organic fiber cords.

DETAILED DESCRIPTION OF THE PREFERRED EMBODIMENTS

Figure 1:
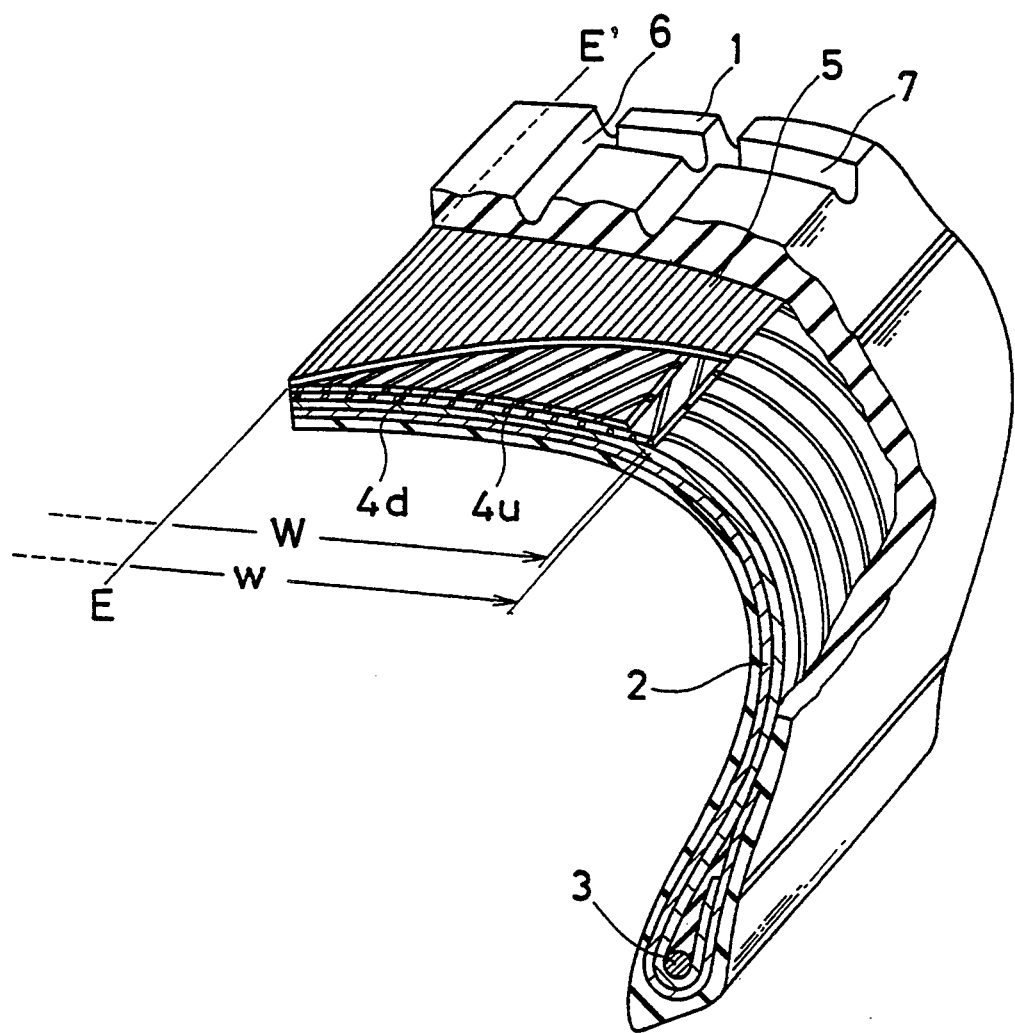
FIG. 1 is a perspective view of the essential parts, partly broken, of a radial tire for passenger cars embodying the present invention.
Figure 2:
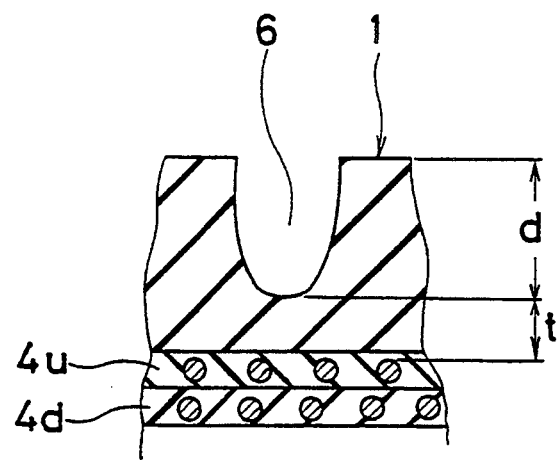
FIG. 2 is an enlarged sectional view of a main groove portion in the tread of the tire according to the invention.

FIGS. 1 and 2 illustrate a pneumatic radial tire for passenger cars constructed in accordance with the present invention. In the drawing, 1 is the tread and 2 is the carcass comprising organic fabric cords, such as nylon or polyester cords. The carcass 2 extends transversely and is folded round each of a pair of bead cores 3, inside out. In the carcass the angle the cords make with the circumferential direction EE' of the tire is substantially 90 deg. In the tread 1 there are disposed outside the carcass 2 belt plies, comprising aramid fiber cords, i.e., inner belt ply $4d$ and outer belt ply $4u$, along the circumference of the tire. The both belt plies are kept unfolded along their edge portions and are in an arrangement of the so-called step-cut type, the outer belt ply $4u$ being narrower than the inner belt ply $4d$. The inner belt ply $4d$ and the outer belt ply $4u$ form cord angles of 5 to 40 deg to the circumferential direction EE' of the tire and extend in a crisscross pattern.

On the outer side of the outer belt ply 4u is placed a belt cover ply 5 having a width w radially of the tire so as to cover the total width W of the belt plies. The cord angle of the belt cover ply 5 with respect to the circumferential direction EE' of the tire is no larger than 30 deg, preferably about 0 deg. This belt cover ply 5 is fabricated from organic fiber cords 0.7 mm or smaller in diameter each at a picking density of 35 to 90 percent.

The surface of the tread 1 has main grooves 6 formed in the circumferential direction EE' of the tire and auxiliary grooves 7 extending across the main grooves. The depth d of the main grooves 6 is fixed within the range from 6.0 to 8.5 mm and the thickness t of rubber under the grooves within the range from 0.5 to 2.5 mm.

In realizing this invention, the present inventors made extensive search for the factors that would determine the cornering power of radial tires, on condition that they would favor the weight reduction of the tires. They have found, as a result, that the depth of the grooves formed in the tread principally along the circumference of the tire and the thickness of the rubber layer under the grooves are major determinants of cornering power and that the cornering power increases as the depth of grooves and the thickness of the rubber layer under the grooves decrease, as will be explained in detail later in connection with experimental results. It was found that this relation holds regardless of whether the grooves running circumferentially of the tire are straight or zigzag and whether there are auxiliary grooves formed across them in the width direction of the tire. However, as noted above, replacement of the cords of the belt plies from steel to aramid fiber results in a loss of up to about 25 percent of cornering power. The inventors also found that practically this cornering power loss cannot be made up for solely by the technical improvements in respect of the groove depth and the thickness of the rubber layer under the grooves. It has now been found that the object of the invention can be achieved by the combination of the above improvements with the covering of the belt plies with a belt cover ply, with the choice of specific cord diameter and picking density for the organic fiber cords constituting the cover ply.

The invention will now be described in detail with reference to its experimental examples.

Figure 3:
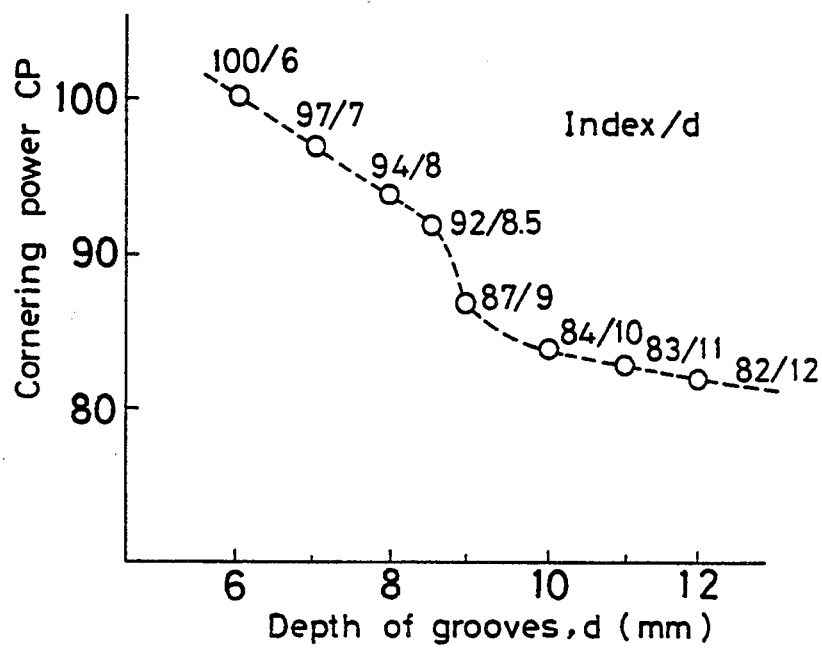
FIG. 3 is a graph showing the relation between the depth d of grooves and the cornering power Cp.

FIG. 3 shows experimental results on the relation between the depth d of grooves and the cornering power CP. The experiments were conducted with eight different radial tires which had a common tire structure but varied in the groove depth d; 6, 7, 8, 8.5, 9, 10, 11 and 12 mm.

Tread structure: in the structure of FIG. 1, the belt cover ply was removed.
Tire size: 185/70R13
Belt structure:
No. of belt plies: two
Width of belt plies: outer/inner=120/130 mm
Code angle: 21°
Cords: aramid fiber 1500 D/2
No. of ends: 45 ends/50 mm
Thickness of the rubber layer under grooves: 3.0 mm The cornering power CP was determined by a drum test, in which the test tire was driven to run under a load of 450 kgf and at a speed of 10 km/h. The lateral force at the time of the slip angle of 1 deg rightward and that at the slip angle of 1 deg leftward were measured, and the mean of the both measured values (absolute mean) was given as an index, with the measured value of a tire with a groove depth of 6 mm being 100.

Figure 4:
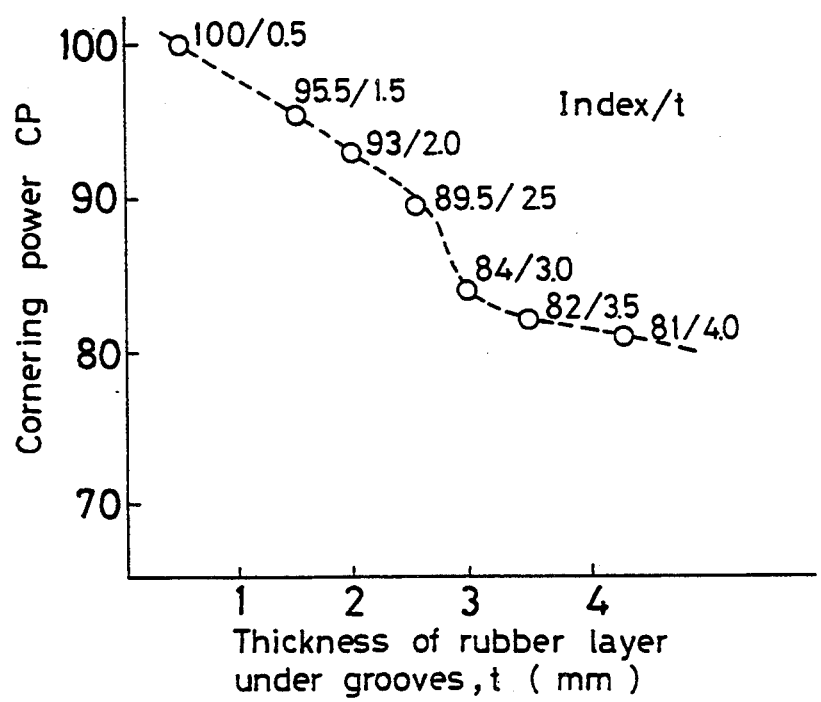
FIG. 4 is a graph showing the relation between the thickness t of rubber under grooves and the cornering power CP.

FIG. 4 shows the experimental results on the relation between the thickness t of rubber under grooves and the cornering power CP. The experiments were performed with seven different radial tires which had the same tread structure, tire size, belt structure, and groove depth of 8.5 mm as those of the tires used in the experiments described above. The tires differed only in the thickness of the rubber layer under grooves t, varying from 0.5 to 1.5, 2.0, 2.5, 3.0, 3.5, and 4.0 mm. The cornering power CP was determined by the method used for FIG. 3, as an index with the measured value of a tire having an under-groove rubber thickness t of 0.5 mm being 100.

As regards the depth of grooves, FIG. 3 indicates that the shallower the grooves the greater the cornering power CP and that the power increases sharply as the groove depth decreases below 8.5 mm. This tendency is not limited to the tires of the size tested but is also observed with tires of the other sizes. In conventional radial tires the depth of tread grooves usually ranges from 8 to 11 mm. In the present invention, on the basis of the results shown in FIG. 3, the groove depth is set within the range of 6.0 to 8.5 mm, preferably 6.0 to 7.5 mm. The lower limit of 6.0 mm is chosen in consideration of the wear-resistance life. If the grooves are shallower than this, the tire is no longer suited for practical use.

As for the thickness of the rubber layer under grooves t, it is obvious from FIG. 4 that the cornering power CP increases as the thickness decreases, the power increasing drastically with the thickness below 2.5 mm. Generally the same is true of tires of other sizes. With conventional radial tires a thickness of the rubber layer under grooves in the range of 2.5 to 4 mm is common. According to the present invention, by contrast, a range of 0.5 to 2.0 mm, preferably 1.0 to 2.0 mm, is chosen in view of the data given in FIG. 4. The lower limit of 0.5 mm is put as the minimum for protecting the belt cords and preventing them from break or other trouble.

As stated above, the cornering power CP can be increased by reducing the depth d of the (main) grooves formed in the tread and by decreasing the thickness t of rubber under the grooves. However, the favorable effect of the groove depth d upon the cornering power CP is such that, in the case where the depth is at the lower limit of 6.0 mm, at most about 9 percent more power is produced than by a conventional tire having the lower-limit groove depth of 8.5 mm. Also, the improvement in cornering power CP with the thickness t of rubber under grooves, in the case of the lower-limit thickness of 0.5 mm, is at most about 19 percent over the lower acquired with a conventional tire having a power-limit thickness of 3.0 mm. Thus, the low flexural rigidity of the belt plies of aramid fiber cords cannot be offset satisfactorily by the adjustments of the depth d of grooves and the thickness t of rubber under the grooves. It is difficult for the tire with such belt plies to exhibit conerning power greater than that with steel-cord belt plies.

The present invention makes up for the lack of cornering power due to the mere combination of the groove depth d and the under-groove rubber thickness t by the provision of at least one belt cover ply, which covers at least the both edge portions of at least one belt ply using aramid fiber cords, at a cord angle of no more than 30 deg to the circumference of the tire, the belt cover ply being formed from organic fiber cords of a specific cord diameter at a specific picking density $p$. In this way a cornering power greater than that with steel-cord belt plies can be obtained.

Figure 5:
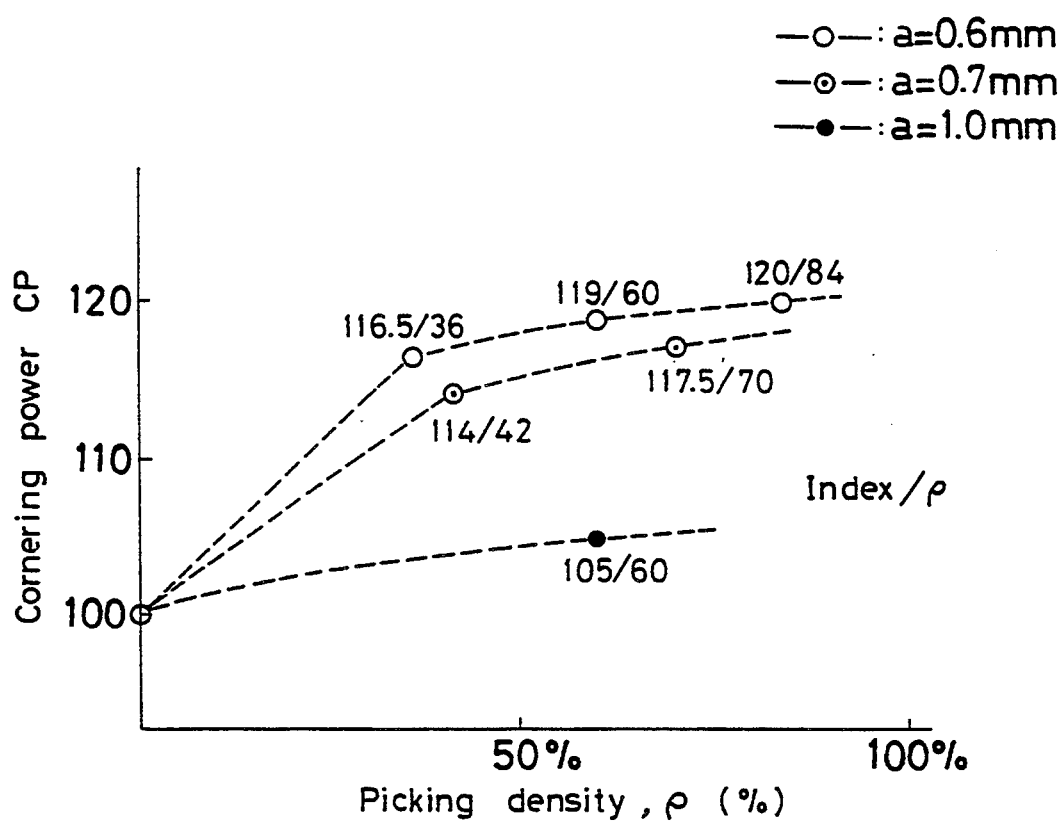
FIG. 5 is a graph showing the relation between the cord diameter a and picking density $p$ of the belt cover ply and the cornering power CP.

FIG. 5 shows experimental results on the relation between the cord diameter and picking density of nylon cords constituting a belt cover ply and the cornering power CP. The experiments were conducted with radial tires which had the same tire size and belt structure as those of the tires used for the experiments of FIG. 3, had a groove depth of 7.0 mm and under-groove rubber thickness of 1.5 mm in common. Moreover, all the tires used a belt cover ply of nylon cords having a cord angle of zero deg to the circumference of the tire. They varied in the structure of belt cover ply, however. Three tires had the same cord diameter of 0.6 mm but were varied in picking density p to 36%, 60%, and 84%. Two had a common cord diameter of 0.7 mm and different picking density $p$ of 42% and 70%. One had a cord diameter of 1.0 mm and a picking density $p$ of 60%. One more tire was not provided with a belt cover ply. The cornering power CP was determined by the same method as that used for FIG. 3, and expressed as an index on the basis of the measured value of the tire not provided with a belt cover ply as 100.

FIG. 5 indicates that the belt cover ply using cords 1.0 mm in diameter did not contribute appreciably to the improvement of cornering power CP. With the tires provided with belt cover plies using 0.7 mm- and 0.6 mm-dia. cords, the higher the picking density $p$ the greater was the cornering power CP.

As is clear from FIG. 5, the cornering power CP varies materially with the diameter and picking density of the organic fiber cords that constitute the belt cover ply of the tire. The present invention uses a cord diameter of no greater than 0.7 mm and a picking density $p$ of no less than 35%, preferably no less than 50%. If the picking density $p$ is excessively high, the cord interval will become so narrow that the durability is adversely affected. Hence it is necessary to put an upper limit of 90%, preferably 85%.

In the present invention the angle the cords of the belt cover ply 5 make with the circumference of the tire is desirably about zero deg. Substantially the same favorable effect can be attained if the cord angle does not exceed 30 deg. The belt cover ply 5 may take the form of a full cover, extending over the entire outer surface of a two-ply laminate comprising an outer belt ply 4$u$ and an inner belt ply 4$d$. Alternatively, it may serve as an edge cover which covers an edge portion but not the middle region of the laminate. That is to say, the belt cover ply 5 comprises two spaced edge covers, which respectively cover one and the other edge portions of the laminate, and each is desired to have a width of at least 10% of the total width of the laminate, with a picking density $p$ of no less than 50% for the organic fiber cords. With the two spaced edge covers, the depth of grooves in the tread is desired to be in the range of 6 to 7 mm and the thickness of the rubber layer under the grooves in the range of 0.5 to 1.5 mm.

The organic fiber cords to be fabricated into the belt cover ply desirably are heat-shrinkable textile cords, such as nylon cords or polyester cords. These cords are put to use after surface treatment with resorcin-formalin-latex (RFL) or other similar adhesive and subsequent coating with a rubber coating composition.

Under the invention it is advisable that the belt plies be left unfolded along the both edge portions but be "step-cut", and at least one belt ply be made from aramid fiber cords. This structure permits further weight reduction of the tire, facilitates the handling of high-rigidity aramid fiber cords, and enhances the productivity. When only one belt ply is made from aramid fiber cords, the other ply is desirably made from steel cords.

Desirable aramid fiber cords to be used in the belt plies comprise twisted yarns of filaments with the total denier of 500 to 5000 D, preferably 2000 to 3000 D. For good adhesion to rubber coating the twisted yarns are surface treated with an adhesive, such as epoxy resin or resorcin-formalin-latex (RFL). The treated cords are loosely woven like a rattan blind. The loose fabric is coated with a rubber coating material to form a coat with a thickness 0.1 to 1.0 mm larger than the diameter of the cords. Desirably, the coating attains a thickness equivalent to the diameter of the cords plus 0.1 to 0.6 mm.

The two belt plies are placed one over another each at a cord angle of 5 to 40 deg, preferably 15 to 30 deg, to the circumferential direction of the tire, in such a manner that the belt cords of two plies cross each other, with the width in the meridian direction of the tire being 80 to 130%, preferably 90 to 110%, of the road-contacting width of the tire.

EXAMPLE 1

Tire 1, a tire embodying the present invention, which had a tire structure shown in FIG. 1 and a tire specification given in Table 1 with the following tread pattern, was built.

Tread pattern:

Four 6 mm-wide straight grooves (main grooves) were formed, thus defining five ribs almost equivalent in width, on the road-contacting surface of the tread circumferentially of the tire. A plurality of grooves (auxiliary grooves) having a width of 4 mm and the same groove depth as that of the straight main grooves were formed radially at the intervals of about 26 mm to divide the ribs into rectangular blocks. Thus, a block pattern was made in which 72 rectangular blocks were arranged along the circumference of the tire.

Also, a total of six different tires, Tires 2, 3, 4, and 5 embodying the invention and Comparative Tires 1 and 2 were built, all to the specification of Tire 1 of the invention, except that the groove depth d, undergroove rubber thickness t, width w of the belt cover ply (mm), picking density $p$ (%), and the cord angle (°) with respect to the circumference of the tire were varied as shown in Table 3. (Comparative Tire 1 had no belt cover ply.)

For comparison purposes, a conventional tire was made to the specification shown in Table 3, without a belt cover ply and using steel cords of a construction 1×5 (0.25 mm) in place of the aramid fiber cords.

These eight tires were evaluated in respect of the cornering power CP as determined by the method already described in connection with FIG. 3. The results are given, together with the comparison of weights per tire, in Table 3. The numerical values of cornering power CP thus evaluated are indices based on the CP value of the conventional tire as 100. The weights of the tires are based on the weight of the conventional tire as the reference.

TABLE 1

| | Tire size | 185/70R13 |
|---|---|---|
| Belt ply | Type of cord | 1500D/2 aramid fiber |
| | Angle of cords circumferentially of tire | 21 deg |
| | No. of ends | 45/50 mm width |
| | Width of the outer belt ply | 120 mm |
| | Width of the inner belt ply | 130 mm |
| Depth of grooves, d | | 8.5 mm |
| Thickness of rubber under grooves, t | | 2.5 mm |
| Belt cover ply | Type of cord | 840 D/2 nylon cord |
| | Dia. of cord, a | 0.6 mm |
| | Angle of cords to the circumference of tire | 0 deg |
| | Picking density, $p$ | 84% |
| | Width, w | 140 mm |

TABLE 2

| Compound ingredient | Proportion (part by weight) |
|---|---|
| SBR[1] | 137.5 |
| Zinc oxide | 1.5 |
| Stearic acid | 2.0 |
| Antioxidant[2] | 1.8 |
| Wax[3] | 1.0 |
| Carbon black HAF | 70.0 |
| Aromatic oil | 3.0 |
| Vulcanization accelerator[4] | 2.5 |
| Sulfur powder | 2.1 |

[1]"Nipol 1712" a styrene-butadiene copolymer rubber mfd. by Nippon Zeon Co., Ltd.
[2]"Nocrack 6C" by Ouchishinko Kagaku K.K.
[3]"Sunnock" by Ouchishinko Kagaku K.K.
[4]"Sanceler 232-MG" by Sanshin Kagaku K.K.

TABLE 3

| | Depth of groove d (mm) | Thickness of rubber under groove t (mm) | Belt cover ply | | | | CP | Weight of tire (g) |
|---|---|---|---|---|---|---|---|---|
| | | | Area* | Width (mm) | Denisty (%) | Angle | | |
| Conventional Tire | 8.5 | 3.0 | — | — | — | — | 100 | reference |
| Comparative Tire 1 | 8.5 | 3.0 | — | — | — | — | 75 | −530 |
| Comparative Tire 2 | 8.5 | 2.5 | all | 130 | 84 | 0 | 96 | −515 |
| Tire of this invention 1 | 8.5 | 2.0 | all | 130 | 84 | 0 | 100 | −695 |
| 2 | 6.0 | 2.0 | all | 130 | 84 | 0 | 107 | −1370 |
| 3 | 6.0 | 0.5 | all | 130 | 84 | 0 | 115 | −1910 |
| 4 | 7.0 | 1.5 | edges | 40 | 84 | 0 | 105 | −1410 |
| 5 | 7.0 | 1.5 | all | 130 | 84 | 10 | 107 | −1280 |

*"all" = all the area was fully covered; "edges" = edges only were covered.

Table 3 shows that when, as in Comparative Tire 1, the steel cords of the conventional tire are replaced by aramid fiber cords and no belt cover ply was provided, the weight of the tire is reduced by 530 g with the penalty of a 25 percent drop of the cornering power CP.

When the belt plies are covered over the entire width with a belt cover ply but the thickness t of the rubber layer under the grooves is 2.5 mm as in Comparative Tire 2, the tire could not compare well with the conventional tire in cornering power CP. When, as in Tire 1 of the invention, the under-groove rubber thickness t is 2.0 mm, or the upper limit according to this invention, both the tire weight reduction and acquirement of cornering power CP equivalent to that of the conventional tire are made possible.

As typified by Tire 2 of the invention, a tire with an under-groove rubber thickness t of 2.0 mm and a decreased groove depth d of 6.0 mm is substantially reduced in weight and enhanced in cornering power CP to 107. A tire whose under-groove rubber thickness t is at the lower limit of 0.5 mm, like Tire 3 of the invention, achieves a marked weight reduction and a sharp increase of the cornering power CP to 115.

When, as in Tire 4 of the invention, the belt plies are covered only along the edges but the groove depth d is 7.0 mm and the under-groove rubber thickness t is 1.5 mm, the cornering power CP is greater than that of the conventional tire. A tire with a belt cover ply of the full cover type, like Tire 5 of the invention, exhibits an even better cornering power CP.

EXAMPLE 2

Tire 6 of the invention was built in conformity with the specification of Tire 1 in Example 1, with the exception that in Tire 6 the inner belt ply was replaced by a steel-cord belt ply of the cord structure 1×5 (0.25 mm).

The cornering power CP of this Tire 6 according to the invention was evaluated in the manner described in the preceding example. The evaluated value was 121, in terms of the index based on the cornering power CP of the conventional tire in Example 1 as 100, and the tire weight was reduced by 695 g. It is thus obvious that steering stability can be improved while reducing the weight of the tire.

According to this invention, as described above, the depth of grooves and the thickness of the rubber layer under the grooves in the tread are fixed to values lower than those in conventional tires and at least one of the belt plies is fabricated from aramid fiber cords. Consequently, the tire can be lighter than those conventionally using belt plies of steel cords. In addition to the reduced groove depth and under-groove rubber thickness of the tread, the tire includes a belt cover ply of organic fiber cords embedded over the belt plies, using cords of a reduced diameter at an increased picking density. The synergistic effect of these features enables the tire to exhibit a cornering power greater than those of tires using belt plies of steel cords.

What is claimed is:

1. A new pneumatic radial tire for passenger cars having a plurality of grooves formed in the tread and extending at least circumferentially of the tire, the tread being provided with two belt plies therein in such a manner that their belt cords extend in a criss-cross pattern, said grooves having a depth in the range of 6.0 to 8.5 mm, with the thickness of the under-groove rubber layer from the bottom of the grooves to the surface of the cords of the outer belt ply being fixed within the range of 0.5 to 2.0 mm, said belt plies being placed one over another with both edge portions left unfolded, said belt plies forming an angle of from 5 to 40 degree with respect to the circumferential direction of the tire, at least one of said belt plies being made from aramid fiber cords, at least the both edge portions of said belt plies being covered with at least one belt cover ply which has a cord angle of about 0 degree with respect to the circumferential direction of the tire, said at least one belt cover ply being made of organic fiber cords no larger than 0.7 mm in diameter at a picking density of 50 to 90 percent.

2. A radial tire according to claim 1 in which said at least one belt cover ply comprises a full cover covering the entire outer surface of said belt plies.

3. A radial tire according to claim 1, in which said at least one belt cover ply comprises two spaced edge covers each having a width of at least 10% of the total width of the belt plies and respectively covering one and the other edge portions of the belt plies.

4. A radial tire according to claim 1, in which said at least one belt cover ply comprises two spaced edge covers each having a width of at least 10% of the total width of the belt plies and respectively covering one and the other edge portions of the belt plies, the depth of grooves being fixed within the range of 6.0 to 7.0 mm, the thickness of the rubber layer under the grooves being within a range of 0.5 to 1.5 mm.

5. A radial tire according to claim 1, in which said organic fiber cords are heat-shrinkable textile cords.

6. A radial tire according to claim 1, in which said belt plies differ in belt width between the inner ply and the outer ply.

7. A radial tire according to claim 1, in which one of said belt plies is fabricated from the aramid fiber cords and the other ply from steel cords.

8. A radial tire according to claim 1, in which said aramid fiber cords are twisted yarns of filaments, and said cords have a total denier of 500 to 5000 D.

* * * * *